US008736633B2

(12) United States Patent
Gurusamy

(10) Patent No.: US 8,736,633 B2
(45) Date of Patent: May 27, 2014

(54) TRAFFIC SYMBOLOGY ON AIRPORT MOVING MAP

(75) Inventor: Saravanakumar Gurusamy, Tamil Nadu (IN)

(73) Assignee: Honeywell International Inc., Morristown, NJ (US)

( * ) Notice: Subject to any disclaimer, the term of this patent is extended or adjusted under 35 U.S.C. 154(b) by 245 days.

(21) Appl. No.: 13/292,572

(22) Filed: Nov. 9, 2011

(65) Prior Publication Data

US 2013/0113819 A1 May 9, 2013

(51) Int. Cl.

| | |
|---|---|
| ***G09G 5/02*** | (2006.01) |
| ***G09G 5/00*** | (2006.01) |
| ***B64C 13/00*** | (2006.01) |
| ***G05D 1/00*** | (2006.01) |
| ***G06F 19/00*** | (2011.01) |
| ***G08G 1/095*** | (2006.01) |
| ***G08G 1/07*** | (2006.01) |
| ***G01C 23/00*** | (2006.01) |
| ***G01S 13/00*** | (2006.01) |
| ***G01S 13/74*** | (2006.01) |

(52) U.S. Cl.

USPC ........... 345/592; 345/660; 340/907; 340/915; 340/972; 342/33; 342/63; 701/1; 701/15; 701/16; 701/32.4; 244/75.1

(58) Field of Classification Search

USPC ........... 340/906–97, 909–910, 915, 916–917, 340/945, 947, 951, 953, 961, 972, 973, 340/539.13, 539.2; 342/29, 33, 34, 36, 342/63–65; 345/581, 592, 606, 618–619, 345/660, 665; 701/1, 15–16, 55, 32.4, 411, 701/412, 419, 468; 244/2, 75.1, 183–185

See application file for complete search history.

(56) References Cited

U.S. PATENT DOCUMENTS

| | | | | |
|---|---|---|---|---|
| 4,792,906 | A * | 12/1988 | King et al. | 701/5 |
| 5,057,835 | A * | 10/1991 | Factor et al. | 340/995.27 |
| 6,047,233 | A | 4/2000 | Salvatore, Jr. et al. | |
| 6,076,042 | A * | 6/2000 | Tognazzini | 701/301 |
| 6,112,141 | A | 8/2000 | Briffe et al. | |
| 6,314,363 | B1 | 11/2001 | Pilley et al. | |

(Continued)

FOREIGN PATENT DOCUMENTS

| | | | |
|---|---|---|---|
| EP | 1881295 | A1 | 1/2008 |
| EP | 2325825 | A2 | 5/2011 |

OTHER PUBLICATIONS

Yeh, M. and Eon, D.; Surface Moving Map Industry Survey, Aug. 2009; http://www.eurocontrol.int/aim/gallery/content/public/amdb_wg44/2009_Seattle/FAA%20SMM%020Industry%20Survey.pdf.

(Continued)

*Primary Examiner* — Wesner Sajous

(74) *Attorney, Agent, or Firm* — Ingrassia Fisher & Lorenz, P.C.

(57) ABSTRACT

A method and system is described for enhancing ground situational awareness to an aircrew via the display of an airport moving map within an own-ship, including determining the position of the own-ship and an aircraft on one of a taxiway, a runway, or an apron, displaying each of the own-ship and the aircraft on an airport moving map by displaying for each a first symbol that indicates the location on the airport moving map; and displaying a second symbol that changes in transparency in proportion to the range of the airport moving map.

20 Claims, 12 Drawing Sheets

(56) References Cited

U.S. PATENT DOCUMENTS

| | | | | |
|---|---|---|---|---|
| 6,690,299 | B1 * | 2/2004 | Suiter | 340/973 |
| 6,694,249 | B1 | 2/2004 | Anderson et al. | |
| 7,499,794 | B1 | 3/2009 | Bailey et al. | |
| 7,567,187 | B2 | 7/2009 | Ramaiah et al. | |
| RE41,396 | E | 6/2010 | Clark et al. | |
| 7,755,516 | B2 | 7/2010 | Clark et al. | |
| 7,796,055 | B2 | 9/2010 | Clark et al. | |
| 7,868,785 | B1 | 1/2011 | Wang | |
| 8,000,854 | B2 | 8/2011 | Majka | |
| 2003/0130771 | A1 * | 7/2003 | Crank | 701/4 |
| 2007/0018887 | A1 | 1/2007 | Feyereisen et al. | |
| 2008/0140727 | A1 | 6/2008 | Pschierer | |
| 2008/0266054 | A1 * | 10/2008 | Crank | 340/5.52 |
| 2008/0275642 | A1 | 11/2008 | Clark et al. | |
| 2008/0281512 | A1 * | 11/2008 | Wipplinger et al. | 701/208 |
| 2009/0051570 | A1 | 2/2009 | Clark et al. | |
| 2010/0280753 | A1 * | 11/2010 | Chytil et al. | 701/208 |
| 2011/0125399 | A1 | 5/2011 | Clark et al. | |
| 2011/0130897 | A1 * | 6/2011 | Gladysz et al. | 701/15 |
| 2011/0264312 | A1 * | 10/2011 | Spinelli et al. | 701/16 |

OTHER PUBLICATIONS

Chapter 5, Label Generation for Static Airport Charts; http://tuprints.ulb.tu-darmstadt.de/978/2/pschierer_-_automatic_label_generation_for_airport_charts-chap5-7.pdf, Nov. 26, 2007.

Jeppesen; Electronic Flight Bag, Airport Moving Map; http://www.jeppesen.com/download/ca/AMM_Insert.pdf, 2002.

Clark, S. and Trampus, G.; Improving Runway Safety with Flight Deck Enhancements, Feb. 5, 2011.

EP Search Report for EP 12 191 507.8 dated Jan. 23, 2013.

EP Office Action for EP 12 191 507.8 dated Feb. 5, 2013.

* cited by examiner

TRAFFIC SYMBOLOGY ON AIRPORT MOVING MAP

TECHNICAL FIELD

The present invention generally relates to ground operation of aircraft and more particularly to a method and system providing situation awareness of aircraft on runways and taxiways.

BACKGROUND OF THE INVENTION

It is important for pilots to know the position of the aircraft which they are operating (referred to herein as their "own-ship") and other aircraft on taxiways and runways when taxing for takeoff or from landing. Navigation of an airport surface (taxiways/runways) can be difficult, especially in limited visibility of night and/or weather, or at unfamiliar airports.

Airport Moving Maps (AMM) are an overlay, for example, on a multi-function display/inertial navigation display (MFD/INAV), where airport features like runways, taxiways, and aprons, are shown on the display. The range may be reduced to increase the resolution of the display. Depiction of the own-ship position reference point is extremely important. In one known MFD/INAV, the own-ship symbol is a fixed object that doesn't change in size and shape. This own-ship symbol is an abstract representation and does not reflect the physical extent of the aircraft. This is an important consideration when correlating the aircraft symbol with a highly magnified/zoomed-in (small range on a large display) airport surface map. For example, a displayed aircraft symbol may be extremely larger than the runway. This scenario worsens when the traffic symbols are added. Displayed aircraft parked at a hold position of the taxiway may overlap and infringe on the runway, while in reality, the own-ship aircraft is much smaller than what is depicted and the traffic aircraft are parked with ample clearance at the hold-position. If the size of the aircraft are scaled such that they match their actual physical length on the runway/taxiway, at higher altitudes the aircraft symbols would be so small that they would not be easily visualized.

In another known MFD/INAV, an own-aircraft is represented by two symbols: one opaque own-ship symbol that scales to the range, and another outline aircraft symbol that does not change its shape or size.

In yet another known system, the aircraft symbol never changes in size. The size and shape is fixed so that it is normally is easily visualized on the display by the pilot; however, on an AMM, the range scale may be greatly reduced. AMM features are drawn such that the aircraft symbol is drawn above the physical features like the runways/taxiways/etc. At the lowest range, increasing the aircraft symbol size to match the physical length is not an issue. But at the intermediate ranges where the AMM just starts appearing or is drawn partially, the aircraft symbol size has to be reduced to match the physical length. This increases the difficulty for the pilot to comprehend the existence of the aircraft.

Accordingly, it is desirable to provide a method and system displaying aircraft on the ground in an airport environment that may be more easily understood by the pilot. Furthermore, other desirable features and characteristics of the present invention will become apparent from the subsequent detailed description and the appended claims, taken in conjunction with the accompanying drawings and the foregoing technical field and background.

BRIEF SUMMARY OF THE INVENTION

A first exemplary method is described for enhancing ground situational awareness via a display of a craft on a moving map including a plurality of views from different ranges and displaying at least one path, comprising displaying a first symbol indicating the position of the craft and to scale with the at least one displayed path on which the craft may move; and displaying a second symbol that changes in transparency in proportion to a displayed range of the moving map.

A second exemplary method is described for enhancing ground situational awareness by the display of an airport moving map displaying a plurality of ranges, comprising displaying at least one taxiway for the airport; displaying at least one runway for the airport; determining the position of an own-ship by a GPS system; determining the position of an aircraft by an automatic dependent surveillance-broadcast system; displaying each of the own-ship and the aircraft on the airport moving map, comprising displaying a first symbol that indicates the location on the airport moving map; and displaying a second symbol that changes in transparency in proportion to the range of the airport moving map.

A ground situational awareness system for an own-ship, comprises a display; a global positioning system configured to provide a location for the own-ship; a data link configured to receive a location from an automatic dependent surveillance-broadcast system for an aircraft; a processor configured to display on an airport moving map at least one taxiway for the airport; and the own-ship and the aircraft as a first symbol that indicates the position on the airport moving map, and a second symbol that changes in transparency in proportion to the range of the airport moving map.

BRIEF DESCRIPTION OF THE DRAWINGS

The present invention will hereinafter be described in conjunction with the following drawing figures, wherein like numerals denote like elements.

DETAILED DESCRIPTION OF AN EXEMPLARY EMBODIMENT

Figure 1:
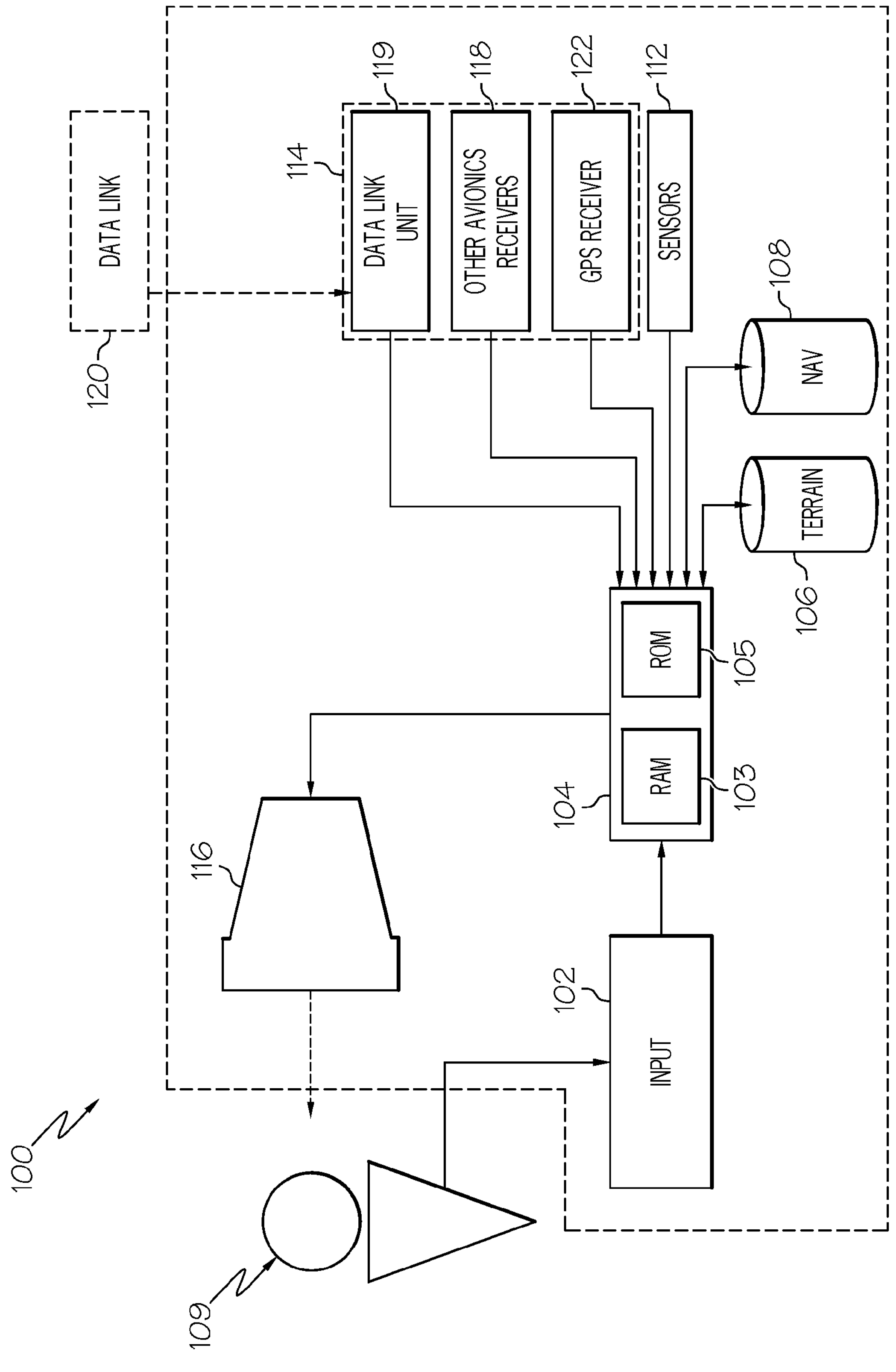
FIG. 1 is a functional block diagram of a flight display system.

The following detailed description of the invention is merely exemplary in nature and is not intended to limit the invention or the application and uses of the invention. Furthermore, there is no intention to be bound by any theory presented in the preceding technical field, background, brief summary, or the following detailed description.

While the exemplary embodiments described herein refer to displaying the information on aircraft, the invention may also be applied to other exemplary embodiments such as displays in sea going vessels and displays used by traffic controllers.

A method is disclosed that presents symbols on an Airport Moving Map (AMM) for providing the location of aircraft on the ground to a pilot or controller. The system and method disclosed herein displays a first symbol, for example a circle or a dot (a circle that is filled in) that indicates the actual location of the aircraft, and may, in some embodiments, change in size, or size and shape in proportion to a range of the AMM, and a second symbol that may be in the shape of an aircraft, that changes in transparency in proportion to the range of the AMM. Range as used herein is defined as the span, or scale, of the map. The range is high when the view is from afar, which may display an entire airport for example. The range is low when the view is from close by, which may display only an intersection of a taxiway and a runway for example.

At higher ranges where the AMM typically first appears to the pilot, the transparency of the second symbol is high (low intensity), but visible, and may appear as an outline. At lower ranges the second symbol may be filled in (solid). The first and second symbols may be of different colors to improve recognition.

These disclosed exemplary embodiments greatly reduce clutter on the display while the awareness of the present position of the own-ship and other aircraft are clear and intact.

The location of the displayed first symbol of an own-ship may be determined, for example, from a global positioning system (GPS), and for other aircraft from an Automatic Dependent Surveillance-Broadcast system (ATS-B). ADS-B, which consists of two different services ADS-B Out and ADS-B In, will be replacing radar as the primary surveillance method for controlling aircraft worldwide. In the United States, ADS-B is an integral component of the NextGen National Airspace strategy for upgrading/enhancing aviation infrastructure and operations. ADS-B enhances safety by making an aircraft visible, real time, to ATC and to other appropriately equipped ADS-B aircraft with position and velocity data transmitted every second. ADS-B also provides the data infrastructure for inexpensive flight tracking, planning and dispatch. The system relies on two avionics components: a high-integrity GPS navigation source and a datalink (ADS-B unit). There are several types of certified ADS-B data links, but the most common ones operate at 1090 MHz, essentially a modified Mode S transponder, or at 978 MHz (USA only).

The transparency of the displayed second symbol displayed is also a function of the physical length of the actual aircraft. As the range decreases, the transparency decreases (the aircraft becomes more visible) until the transparency is lowest when the displayed aircraft is the same size of the actual aircraft in relation to other displayed objects, for example, taxiways.

In one exemplary embodiment, the first symbol can be scaled as a circle to show the envelope or the physical length of the aircraft. At higher ranges of the AMM, the envelope might actually resemble a dot, because that is the actual physical length. As the range decreases, the circle can be scaled to represent the envelope/physical length. The first symbol (envelope circle) is a semi-transparent layer so that it doesn't mask any of the airport features and aircraft. When the range is further reduced, the size of the circle increases. The transparency of the enveloping circle might also reduce.

This enveloping circle can be used to detect any possible collisions. If the envelope circle of a traffic aircraft intersects with the runway, a runway busy alert can be displayed. A close proximity of two aircraft envelopes can be used for a possible traffic collision alert. As the size of the circle increases, the transparency increases (circle becomes less visible) because the second symbol (aircraft symbol) becomes more visible and prominent. So at higher ranges, the first symbol (circle) is very prominent and the second symbol (aircraft) is less visible; and at lower range settings, the first symbol is less visible and the second symbol is more prominent and visible.

The circle could also be used to represent the GPS error and/or Estimated Position of Uncertainty (EPU). An inner circle would represent the actual physical length. An outer circle could be drawn to indicate the positional error via GPS or any source.

This concept may be utilized with the Automatic Dependent Surveillance-Broadcast/Cockpit Display of Traffic Information (ADS-B/CDTI) symbols as well. As in previous embodiments, at higher ranges of AMM display, the (first) ADS-B/CDTI symbols would have a high transparency. And at lower ranges, the CDTI symbols will have no or little transparency and the first symbol (circle) will have very high transparency (the circle is slightly visible because the CDTI symbol is more visible). Based on range, the first symbol (circle) could be bigger than the second symbol (fixed size symbol) since the circle represents actual physical length.

Referring to FIG. 1, an exemplary flight deck display system 100 is depicted and will be described for displaying aircraft on taxiways. The system 100 includes a user interface 102, a processor 104, one or more terrain/taxiway databases 106, one or more navigation databases 108, various optional sensors 112 (for the cockpit display version), various external data sources 114, and a display device 116. In some embodiments the user interface 102 and the display device 116 may be combined in the same device, for example, a touch pad. The user interface 102 is in operable communication with the processor 104 and is configured to receive input from a user 109 (e.g., a pilot) and, in response to the user input, supply command signals to the processor 104. The user interface 102 may be any one, or combination, of various known user interface devices including, but not limited to, a cursor control device (CCD) 107, such as a mouse, a trackball, or joystick, and/or a keyboard, one or more buttons, switches, or knobs.

The processor 104 may be any one of numerous known general-purpose microprocessors or an application specific processor that operates in response to program instructions. In the depicted embodiment, the processor 104 includes on-board RAM (random access memory) 103, and on-board ROM (read only memory) 105. The program instructions that control the processor 104 may be stored in either or both the RAM 103 and the ROM 105. For example, the operating system software may be stored in the ROM 105, whereas various operating mode software routines and various operational parameters may be stored in the RAM 103. It will be appreciated that this is merely exemplary of one scheme for storing operating system software and software routines, and that various other storage schemes may be implemented. It will also be appreciated that the processor 104 may be implemented using various other circuits, not just a programmable processor. For example, digital logic circuits and analog signal processing circuits could also be used.

No matter how the processor 104 is specifically implemented, it is in operable communication with the terrain/taxiway databases 106, the navigation databases 108, and the display device 116, and is coupled to receive various types of inertial data from the various sensors 112, and various other avionics-related data from the external data sources 114. The processor 104 is configured, in response to the inertial data and the avionics-related data, to selectively retrieve terrain data from one or more of the terrain/taxiway databases 106 and navigation data from one or more of the navigation databases 108, and to supply appropriate display commands to the display device 116. The display device 116, in response to the display commands from, for example, a touch screen, keypad, cursor control, line select, concentric knobs, voice control, and datalink message, selectively renders various types of textual, graphic, and/or iconic information. The preferred manner in which the textual, graphic, and/or iconic information are rendered by the display device 116 will be described in more detail further below. Before doing so, however, a brief description of the databases 106, 108, the sensors 112, and the external data sources 114, at least in the depicted embodiment, will be provided.

The terrain/taxiway databases 106 include various types of data representative of the surface over which the aircraft is taxing, the terrain over which the aircraft is flying, and the navigation databases 108 include various types of navigation-related data. These navigation-related data include various flight plan related data such as, for example, waypoints, distances between waypoints, headings between waypoints, data related to different airports, navigational aids, obstructions, special use airspace, political boundaries, communication frequencies, and aircraft approach information. It will be appreciated that, although the terrain/taxiway databases 106 and the navigation databases 108 are, for clarity and convenience, shown as being stored separate from the processor 104, all or portions of either or both of these databases 106, 108 could be loaded into the RAM 103, or integrally formed as part of the processor 104, and/or RAM 103, and/or ROM 105. The terrain/taxiway databases 106 and navigation databases 108 could also be part of a device or system that is physically separate from the system 100.

The sensors 112 may be implemented using various types of inertial sensors, systems, and or subsystems, now known or developed in the future, for supplying various types of inertial data. The inertial data may also vary, but preferably include data representative of the state of the aircraft such as, for example, aircraft speed, heading, altitude, and attitude. The number and type of external data sources 114 may also vary. For example, the external systems (or subsystems) may include, for example, a terrain avoidance and warning system (TAWS), a traffic and collision avoidance system (TCAS), a runway awareness and advisory system (RAAS), a flight director, and a navigation computer, just to name a few. However, for ease of description and illustration, only an onboard datalink unit 119 and a global position system (GPS) receiver 122 are depicted in FIG. 1, and will now be briefly described.

The GPS receiver 122 is a multi-channel receiver, with each channel tuned to receive one or more of the GPS broadcast signals transmitted by the constellation of GPS satellites (not illustrated) orbiting the earth. Each GPS satellite encircles the earth two times each day, and the orbits are arranged so that at least four satellites are always within line of sight from almost anywhere on the earth. The GPS receiver 122, upon receipt of the GPS broadcast signals from at least three, and preferably four, or more of the GPS satellites, determines the distance between the GPS receiver 122 and the GPS satellites and the position of the GPS satellites. Based on these determinations, the GPS receiver 122, using a technique known as trilateration, determines, for example, aircraft position, groundspeed, and ground track angle. These data may be supplied to the processor 104, which may determine aircraft glide slope deviation therefrom. Preferably, however, the GPS receiver 122 is configured to determine, and supply data representative of, aircraft glide slope deviation to the processor 104.

The display device 116, as noted above, in response to display commands supplied from the processor 104, selectively renders various textual, graphic, and/or iconic information, and thereby supply visual feedback to the user 109. It will be appreciated that the display device 116 may be implemented using any one of numerous known display devices suitable for rendering textual, graphic, and/or iconic information in a format viewable by the user 109. Non-limiting examples of such display devices include various cathode ray tube (CRT) displays, and various flat panel displays such as various types of LCD (liquid crystal display) and TFT (thin film transistor) displays. The display device 116 may additionally be implemented as a panel mounted display, a HUD (head-up display) projection, or any one of numerous known technologies. It is additionally noted that the display device 116 may be configured as any one of numerous types of aircraft flight deck displays. For example, it may be configured as a multi-function display, a horizontal situation indicator, or a vertical situation indicator, just to name a few. In the depicted embodiment, however, the display device 116 is configured as a primary flight display (PFD).

Onboard data link 119 is coupled to external data link 120 and is configured to receive data from ground stations and other aircraft. Examples of the data received include, for example, weather information, traffic information, and route changes. In accordance with the present exemplary embodiments, the onboard data link unit 119 receives ADS-B information from external data link 120.

Figure 2:
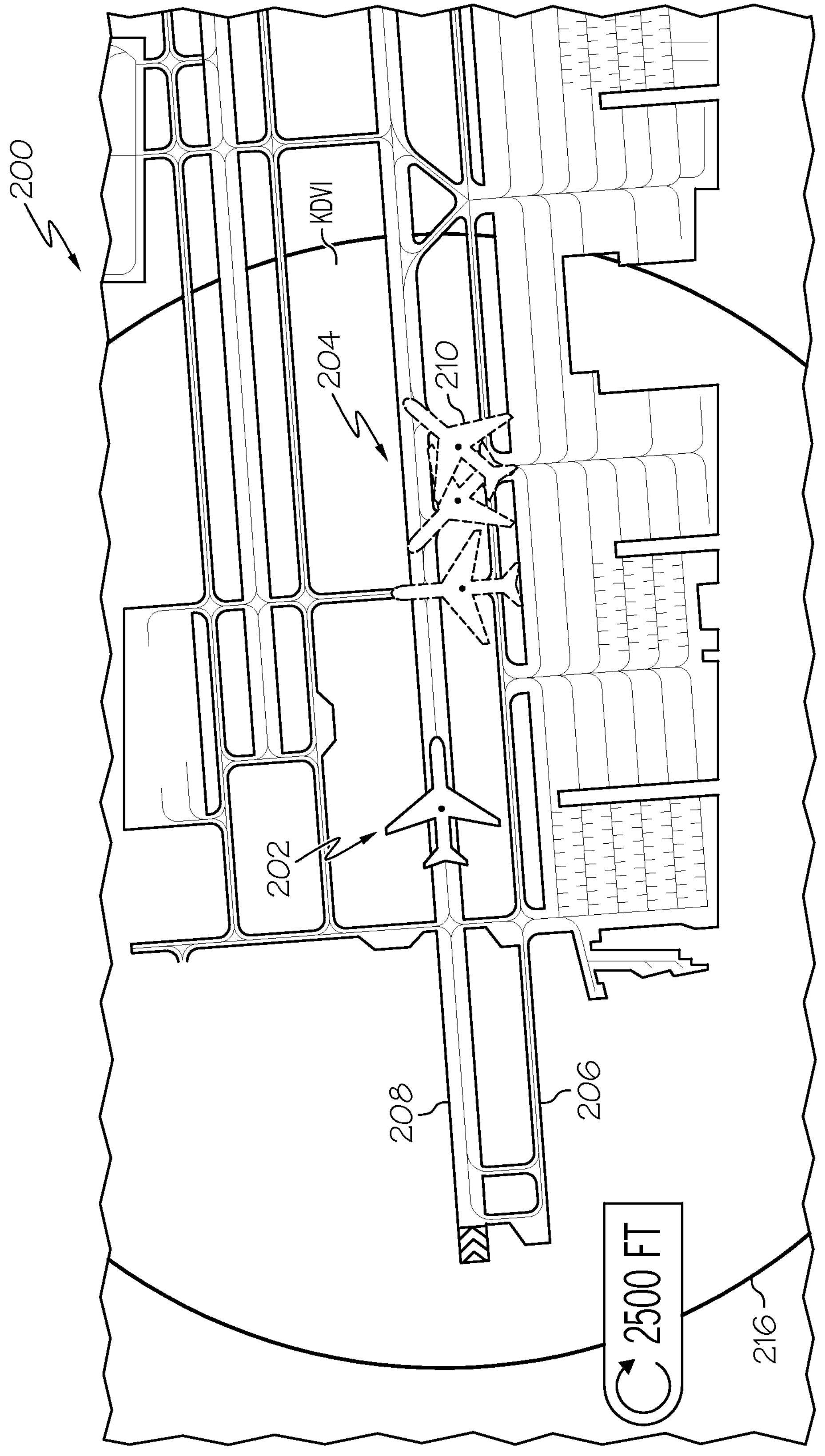
FIGS. 2-4 are three images, displayed at three different ranges in accordance with a first exemplary embodiment that may be rendered on the flight display system of FIG. 1.

With reference to FIG. 2, the display 116 includes a display screen 200 in which an AMM containing multiple graphical images may be displayed. Data for the location and boundaries of the taxiways and the runway are stored in the terrain/taxiway database 106 and are processed by the processor 104 for display. Positional data (location, direction, speed) is determined, by data received by the GPS system 122 and processed for the base, or own-ship, aircraft 202 which contains the flight deck display system 100. Positional data (location, direction, speed) is provided by the ADS-B system to the onboard data link 119 and processed for other aircraft 204 which may contain a similar flight deck display system 100. Images of the taxiways 206, runway 208, and base aircraft 202 and other aircraft 204 are displayed on the display area 200 in a location determined by the positional data. The display area 200 may also include obstacles (not shown), such as airport construction, lighting, and non-taxi areas.

Figure 3:
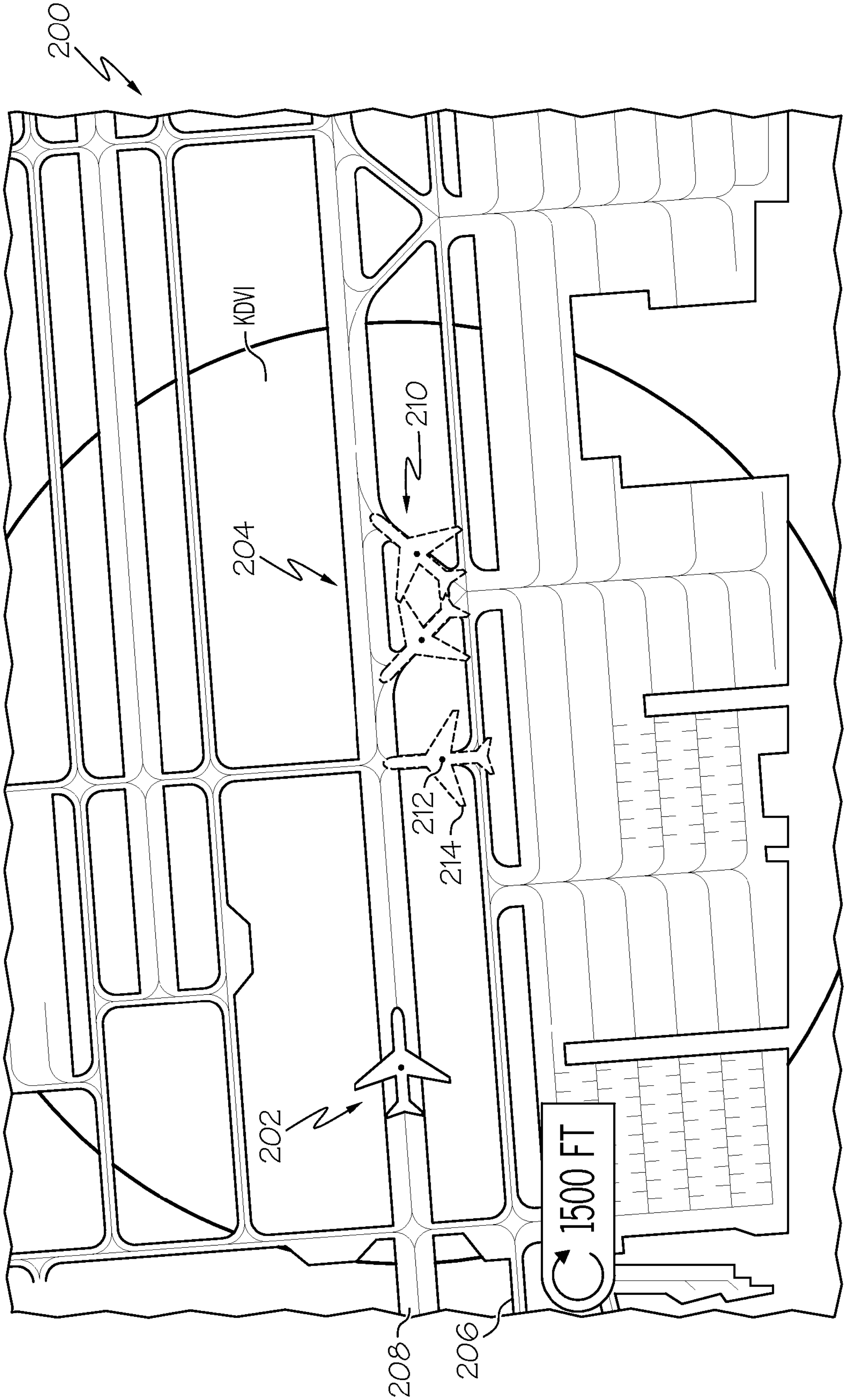
Figure 4:
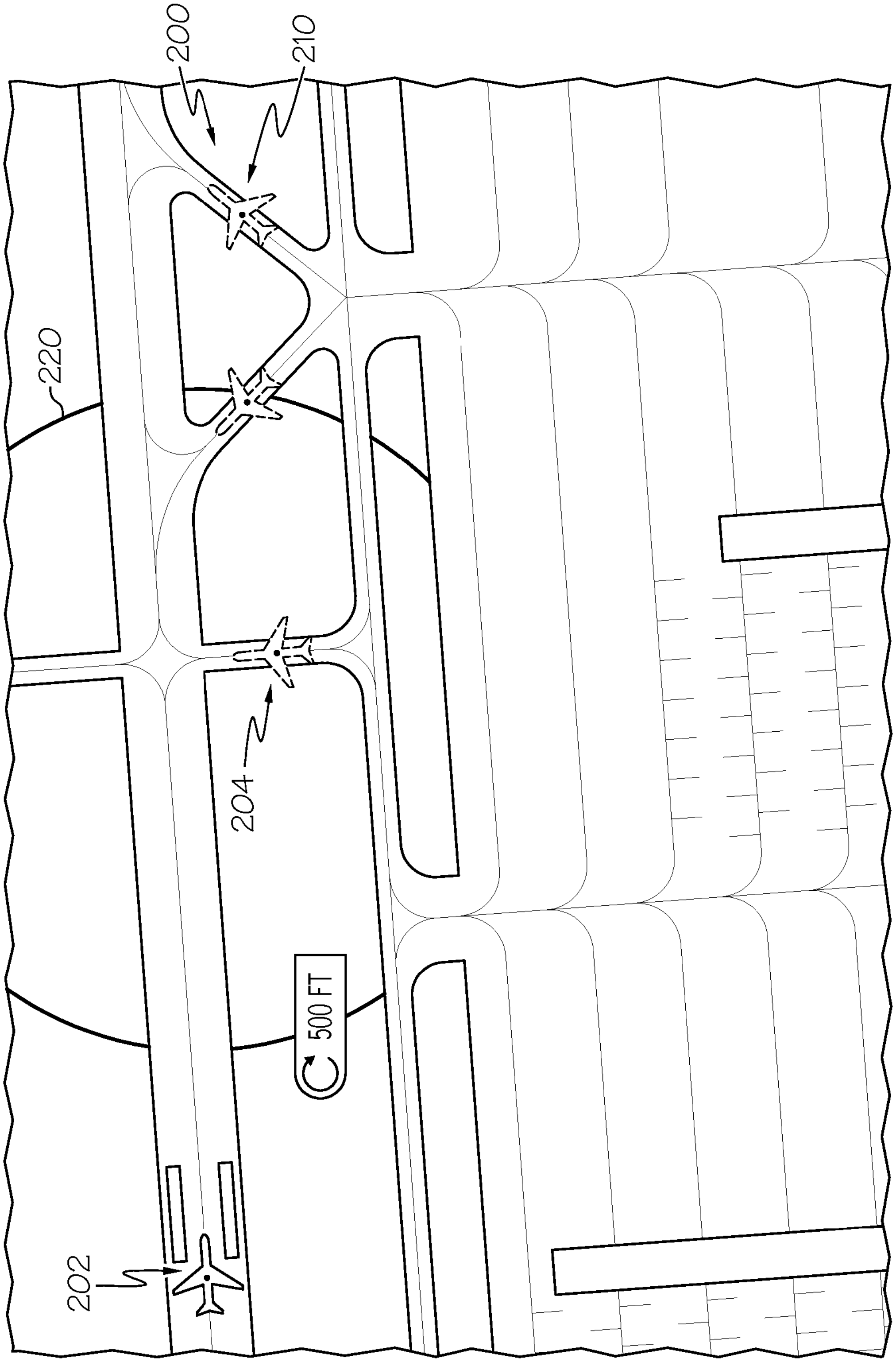

In accordance with a first exemplary embodiment (FIGS. 2-4), each displayed aircraft 204, and the own-ship 202 if displayed, are represented by an icon 210. Each icon 210 includes a first symbol 212, or dot (a filled in circle), and a second symbol 214 that resembles an aircraft in this exemplary embodiment. The location of the displayed first symbol 212 of an own-ship 202 may be provided, for example, from a global positioning system (GPS), and for other aircraft 204 from an Automatic Dependent Surveillance-Broadcast system (ATS-B). The second symbol 214 changes in transparency in proportion to the range of the AMM. The range of FIG. 2 of 2500 feet is the diagonal distance of the circle 216 with the own-ship 202 and other aircraft 204 being somewhat transparent (the taxiways being more visible therebeneath). The range of FIG. 3 of 1500 feet is the diagonal distance of the circle 218 with the own-ship 202 and other aircraft 204 being less transparent. The range of FIG. 2 of 500 feet is the diagonal distance of the circle 220 wherein the own-ship 202 and the other aircraft 204 are not transparent. It should be noted that neither the first symbol 212 nor the second symbol 214 change size on the AMM regardless of the range. While the first symbol indicates the location of the own-ship 202 and other aircraft 204, the transparency provides information about the range, thereby greatly reducing clutter on the display while the awareness of the present position of the own-ship 202 and other aircraft 204 are clear and intact.

Figure 5:
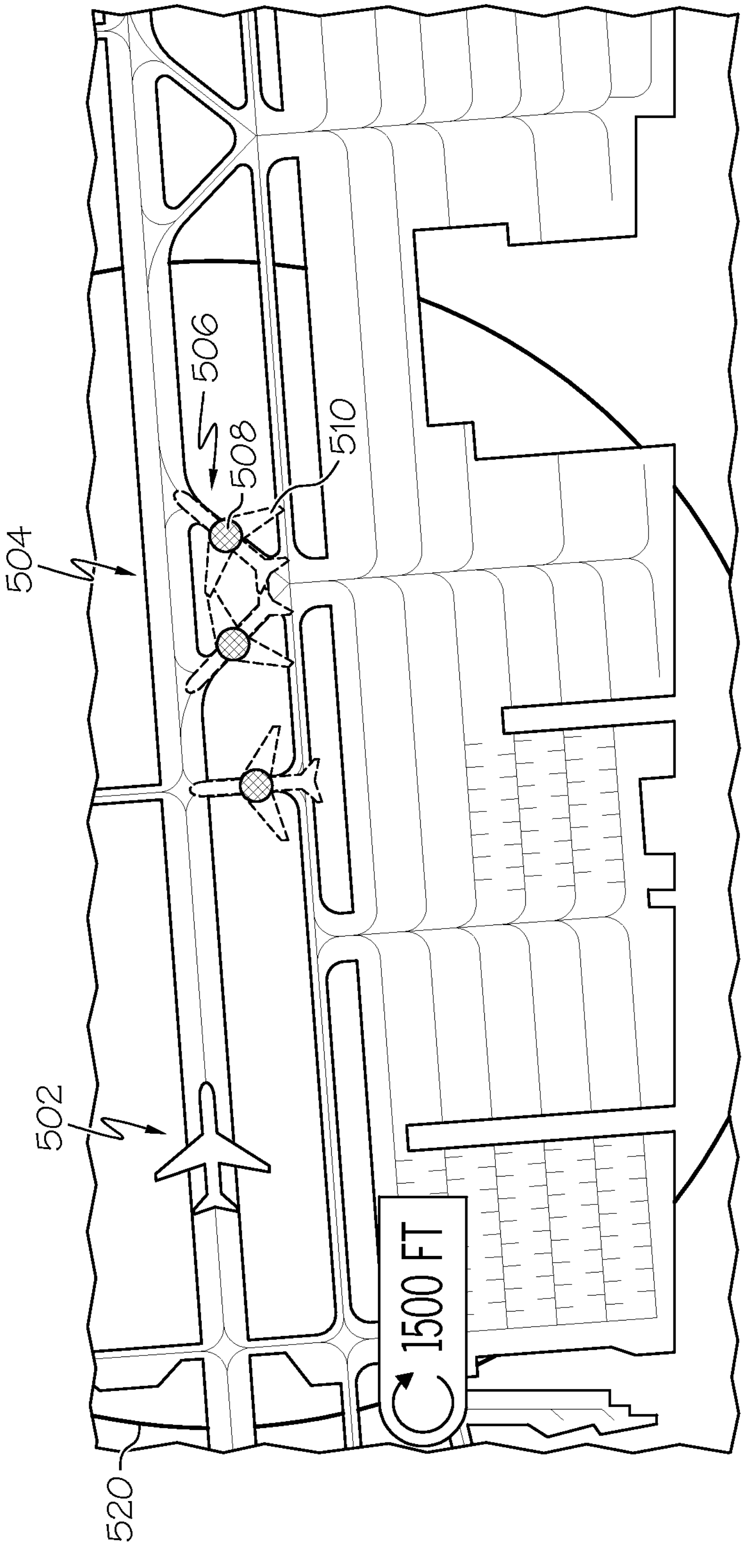
FIGS. 5-6 are two images displayed at two different ranges in accordance with a second exemplary embodiment that may be rendered on the flight display system of FIG. 1.
Figure 6:
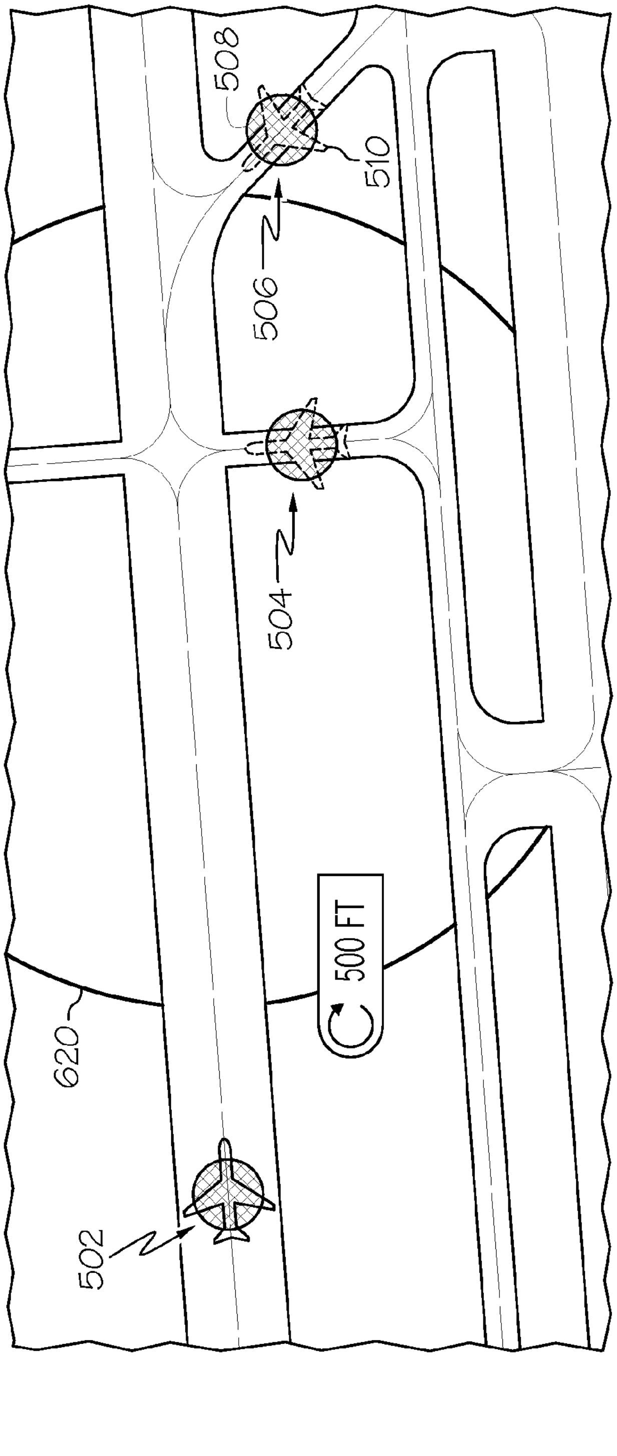

Referring to FIGS. 5 and 6, a second exemplary embodiment displays each aircraft 504, and the own-ship 502 by an icon 506. Each icon 506 includes a first symbol 508, or dot (a filled in circle), and a second symbol 510 that resembles an aircraft. The location of the displayed first symbol 508 of an own-ship 502 may be provided, for example, from a global positioning system (GPS), and for other aircraft 504 from an Automatic Dependent Surveillance-Broadcast system (ATS-B). The second symbol 510 changes in transparency in proportion to the range of the AMM. The range of FIG. 5 of 1500 feet is the diagonal distance of the circle 520 with the own-ship 502 and other aircraft 504 being somewhat transparent (the taxiways being more visible therebeneath). The range of FIG. 6 of 500 feet is the diagonal distance of the circle 620 wherein the own-ship 502 and the other aircraft 504 are not transparent. It should be noted that the second symbol does not change size on the AMM regardless of the range. However, the first symbol, which indicates the size of the aircraft 204 it represents, maintains its size in relation to the other displayed items such as taxiways, therefore increasing in size with a decrease in range. While the first symbol indicates the location of the own-ship 202 and other aircraft 204, the transparency provides information about the range, thereby greatly reducing clutter on the display while the awareness of the present position of the own-ship 202 and other aircraft 204 are clear and intact.

Figure 7:
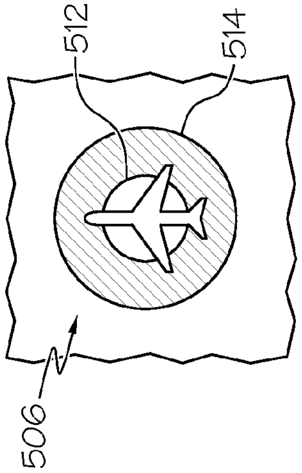
FIG. 7 is an image of an aircraft depicting position error in accordance with a third exemplary embodiment that may be rendered on the flight display system of FIG. 1.

A third exemplary embodiment (see FIG. 7) presents two concentric circles for each icon 506. The inner circle 512 is the first symbol 508 indicating the actual size of the aircraft. The outer circle 514 represents GPS error and/or an estimated position of uncertainty. It may be preferred to use only the outer circle 514 in actual use.

Figure 8:
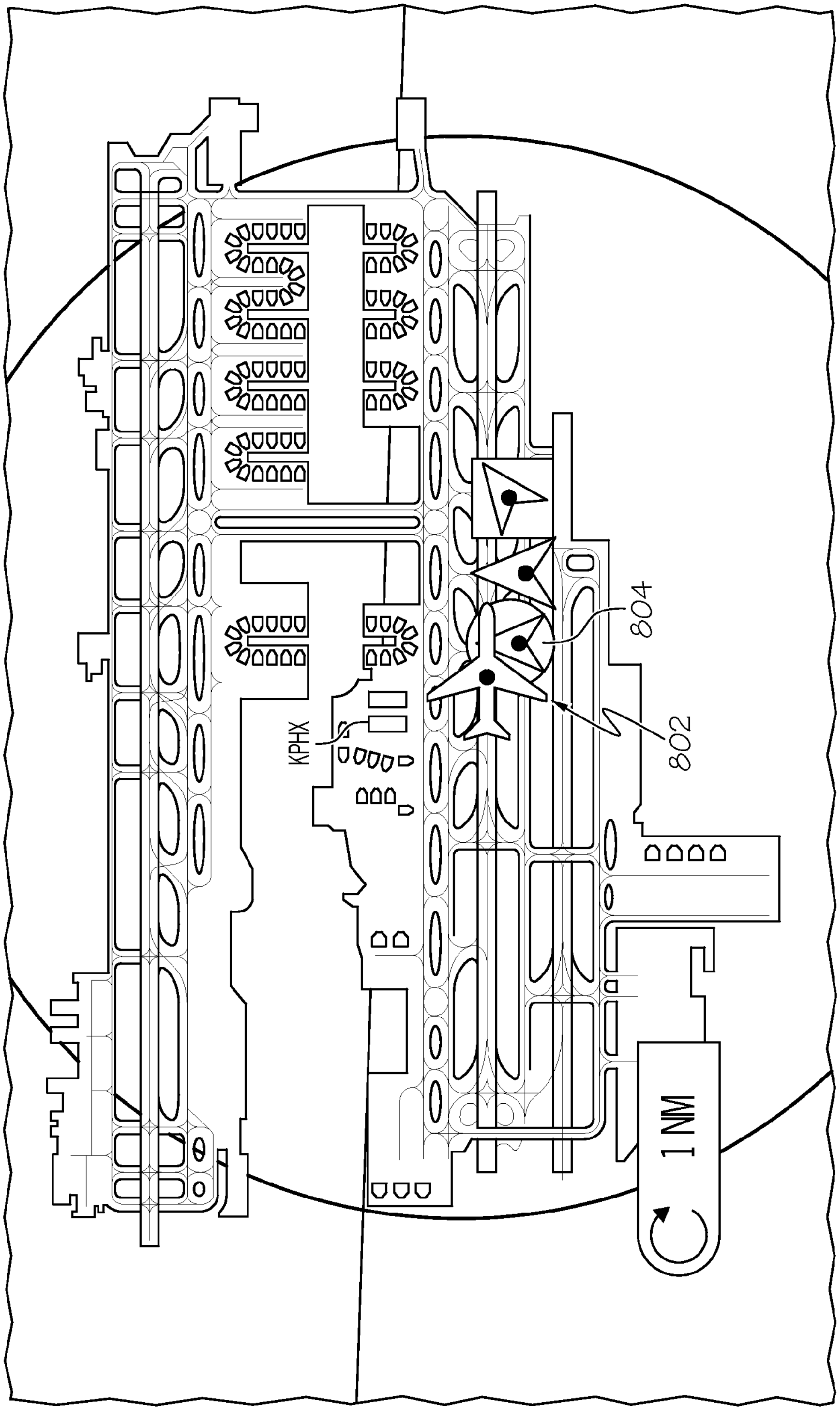
FIGS. 8-10 are three images displayed at three different ranges in accordance with a fourth exemplary embodiment that may be rendered on the flight display system of FIG. 1.
Figure 9:
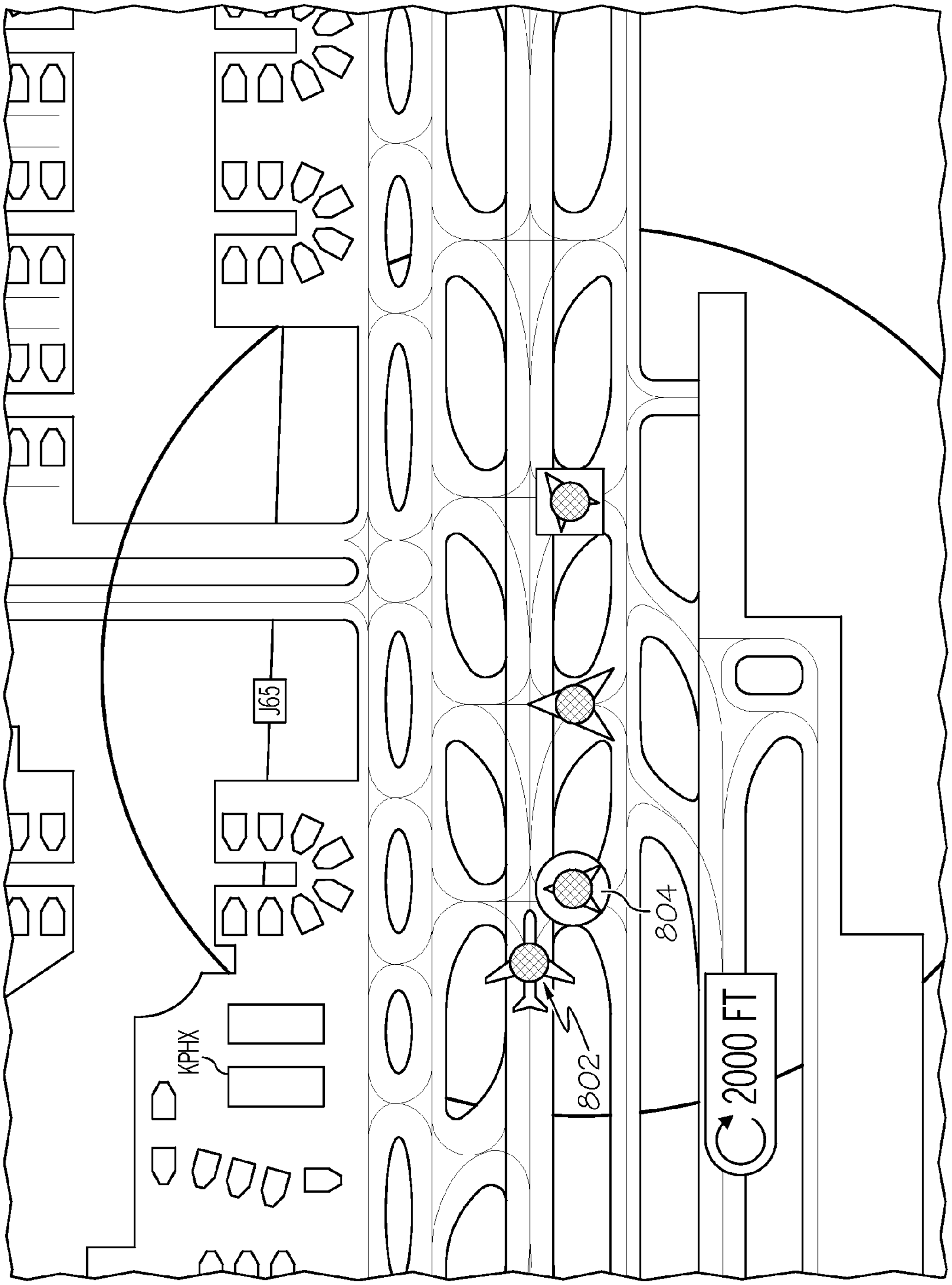
Figure 10:
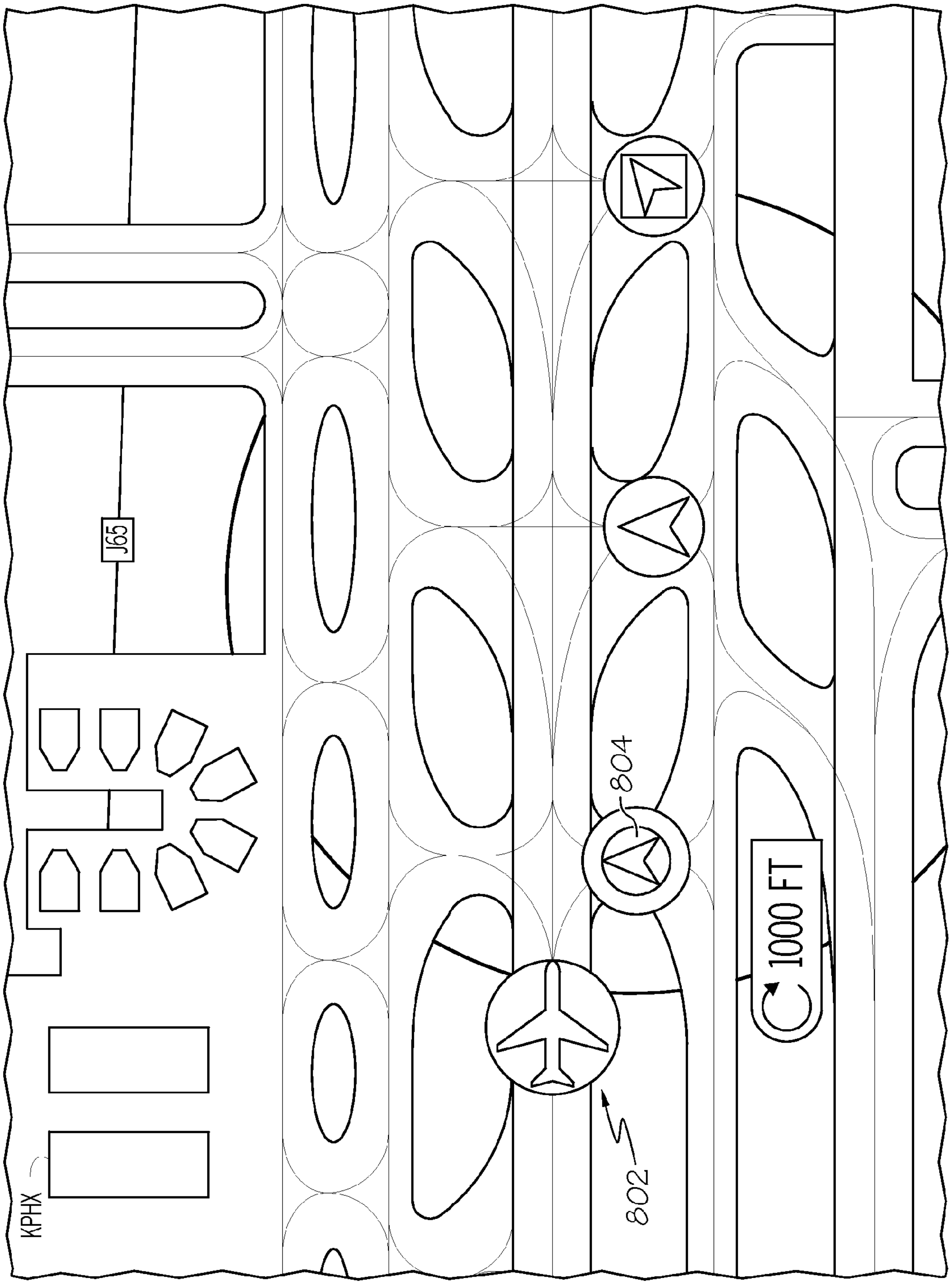

FIGS. 8-10 are a fourth exemplary embodiment that displays CDTI symbols 804 for the other aircraft instead of aircraft representations, while the own-ship 802 is represented by an aircraft symbol. As in the previous embodiments, the CDTI symbols 802 change in transparency in proportion to the range of the AMM. Note that the first symbols 508 may obscure some or all of the CDTI symbols at a low range.

Figure 11:
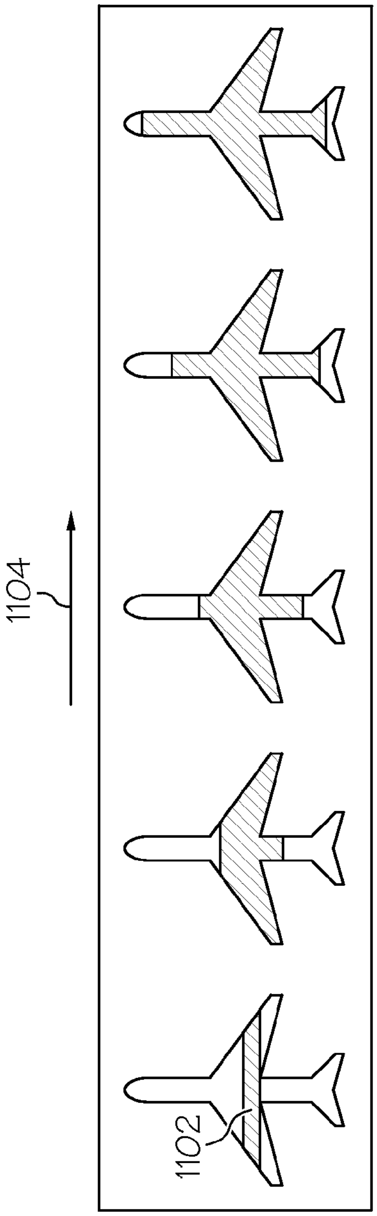
FIG. 11 is an image of five aircraft at five different ranges in accordance with a fifth exemplary embodiment that may be rendered on the flight display system of FIG. 1.
Figure 12:
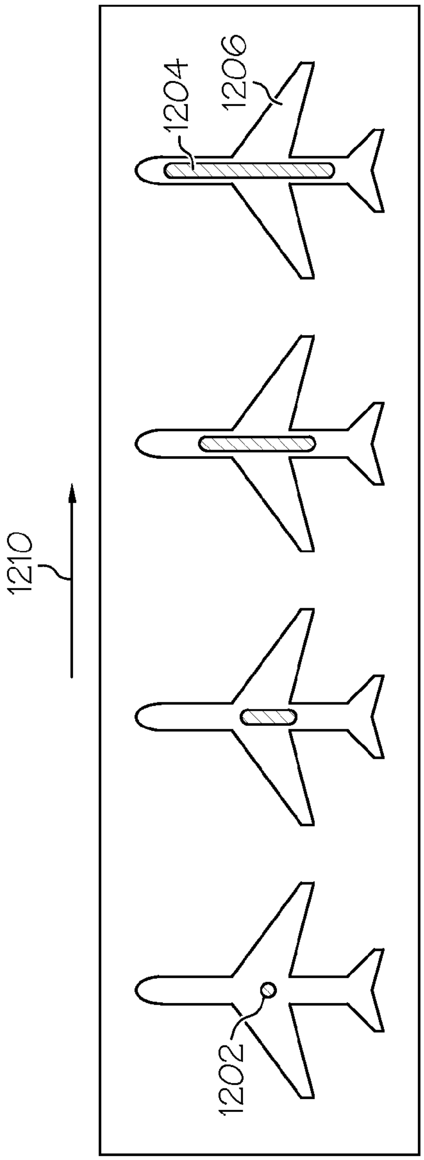
FIG. 12-13 are images in accordance with a sixth exemplary embodiment that may be rendered on the flight display system of FIG. 1.
Figure 13:
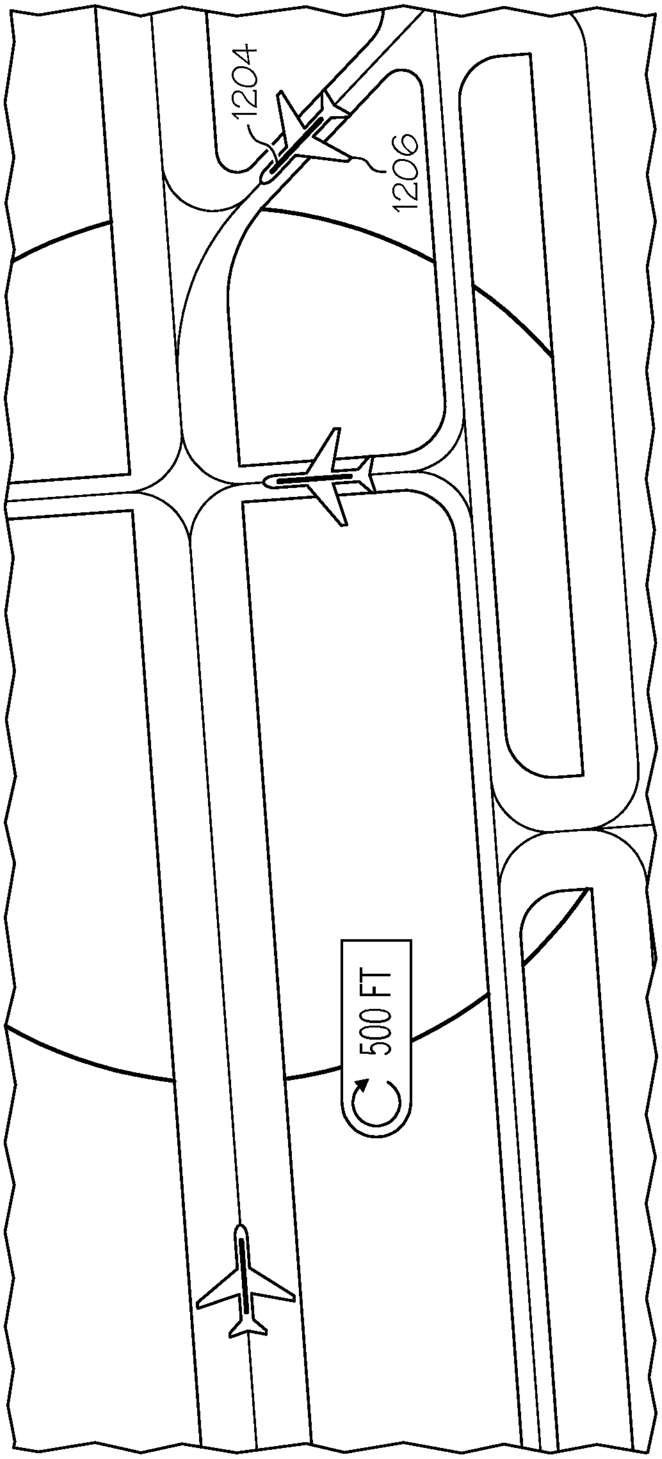

In a fifth exemplary embodiment of FIG. 11 and a sixth exemplary embodiment of FIGS. 12 and 13, the envelope or length of aircraft are presented not by a circle but a bar 1102, 1202, respectively. In FIG. 11, the bar 1102 extends, for example, from wing tip to wing tip. As the range decreases (represented by the arrow 1104), the dimension of the bar 1102 increases from the nose to the tail of the aircraft until the size of the second symbol 510 approaches the actual length of the aircraft. Similarly, in FIGS. 12 and 13, a circle 1202 at a high range expands from nose to tail as the range decreases (represented by the arrow 1210) until the bar 1204 extends from nose to tail when the displayed second symbol 1206 is the actual size of the aircraft.

Figure 14:
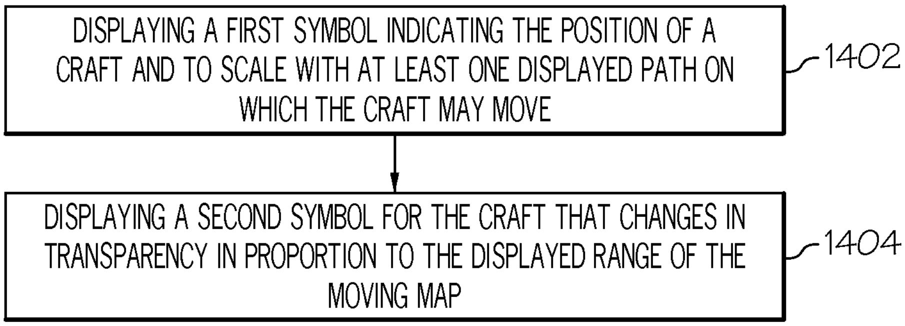
FIG. 14 is a flow chart of the steps of a process for displaying information on a display of an aircraft, in accordance with an exemplary embodiments.

FIG. 14 is a flow chart of the steps of an exemplary method for enhancing ground situational awareness of a crew by displaying a craft on a moving map including a plurality of ranges and displaying at least one path, including displaying 1402 a first symbol indicating the position of the craft and to scale with the at least one displayed path on which the craft may move; and displaying 1404 a second symbol for the craft that changes in transparency in proportion to the displayed range of the moving map.

Figure 15:
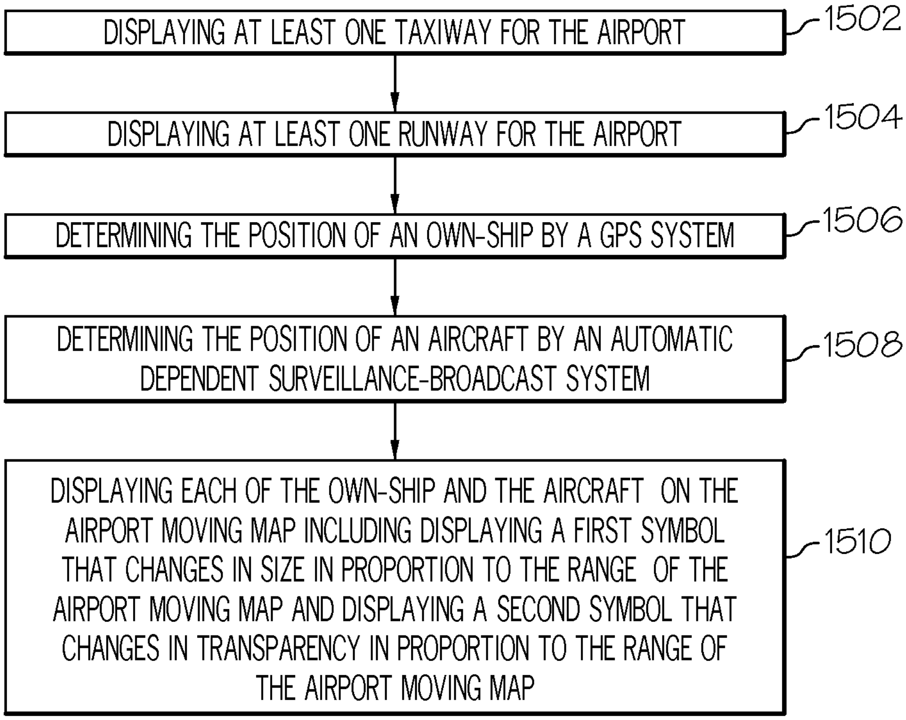
FIG. 15 is a flow chart of the steps of a process for displaying information on a display of an aircraft, in accordance with another exemplary embodiment.

FIG. 15 is another flow chart of another method for enhancing ground situational awareness by the display of an airport moving map displaying a plurality of ranges, including displaying 1502 at least one taxiway for the airport; displaying 1504 at least one runway for the airport; determining 1506 the position of an own-ship by a GPS system; determining 1508 the position of an aircraft by an automatic dependent surveillance-broadcast system; displaying 1510 each of the own-ship and the aircraft on the airport moving map including displaying a first symbol that changes in size in proportion to the range of the airport moving map; and displaying a second symbol that changes in transparency in proportion to the range of the airport moving map.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

The invention claimed is:

1. A method for displaying a first craft and a second craft on a moving map including a plurality of views from different ranges and displaying at least one path, comprising:

displaying a first symbol indicating the position of the first craft and to scale with the at least one displayed path on which the first craft may move; and displaying a second symbol for the second craft that changes in transparency thereby reducing clutter on the moving map, wherein the second symbol is more transparent as the range increases, and wherein the range increases as the view is farther from the moving map.

2. The method of claim 1 wherein the first symbol changes in size, the change in size being inversely proportional to the different ranges.

3. The method of claim 1 wherein the first symbol changes in size and transparency, the change being inversely proportional to the different ranges.

4. The method of claim 1 wherein the first symbol is a circle representing a length of the craft.

5. The method of claim 4 further comprising a second circle indicating one of GPS error or an estimated position of uncertainty.

6. The method of claim 1 wherein the first symbol is a horizontal bar that increases in size vertically, the increase being inversely proportionally to the different ranges.

7. The method of claim 1 wherein the second symbol becomes less transparent as the range decreases.

8. A method for enhancing ground situational awareness by a display of an airport moving map displaying a plurality of ranges, comprising:

displaying at least one taxiway for the airport;

displaying at least one runway for the airport;

determining the position of an own-ship by a GPS system;

determining the position of an aircraft by an automatic dependent surveillance-broadcast system;

displaying each of the own-ship and the aircraft on the airport moving map, comprising:

displaying a first symbol for the own-ship that indicates its location on the airport moving map; and displaying a second symbol for the aircraft that changes in transparency thereby reducing clutter on the moving map, wherein the second symbol is more transparent as the range increases, and wherein the range increases as the view is farther from the airport moving map.

9. The method of claim 8 wherein the first symbol changes in size, the change in size being inversely proportional to the range.

10. The method of claim 8 wherein the first symbol changes in size and transparency, the change being inversely proportional to the range.

11. The method of claim 8 wherein the first symbol is a circle that represents a length of the craft.

12. The method of claim 11 wherein the circle represents an envelope containing the craft.

13. The method of claim 11 further comprising a second circle indicating one of GPS error or an estimated position of uncertainty.

14. The method of claim 8 wherein the second symbol becomes less transparent as the range decreases.

15. The method of claim 8 wherein the second symbol is an aircraft symbol.

16. The method of claim 8 wherein the second symbol is CDTI symbol.

17. A ground situational awareness system for an own-ship, comprising:

a display;

a global positioning system configured to provide a location for the own-ship;

a data link configured to receive a location from an automatic dependent surveillance-broadcast system for an aircraft; and a processor configured to display on an airport moving map:

at least one taxiway for the airport; and the own-ship as a first symbol that indicates the position on the airport moving map, and the aircraft as a second symbol that indicates the position on the airport moving map and changes in transparency thereby reducing clutter on the moving map, wherein the second symbol is more transparent as the range increases, and wherein the range increases as the view is farther from the airport moving map.

18. The ground situational awareness system of claim 17 wherein the first symbol changes in size, the change in size being inversely proportion to the range.

19. The ground situational awareness system of claim 17 wherein the first symbol changes in size and transparency.

20. The method of claim 17 wherein the first symbol is a circle representing a length of the craft.

* * * * *